US 12,368,208 B2

(12) United States Patent
Freter

(10) Patent No.: US 12,368,208 B2
(45) Date of Patent: Jul. 22, 2025

(54) PROTECTIVE DEVICE FOR A HOUSING

(71) Applicant: A. Kayser Automotive Systems GmbH, Einbeck (DE)

(72) Inventor: Heiko Freter, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 608 days.

(21) Appl. No.: 17/735,274

(22) Filed: May 3, 2022

(65) Prior Publication Data
US 2022/0363210 A1 Nov. 17, 2022

(30) Foreign Application Priority Data
May 12, 2021 (DE) ...................... 10 2021 002 519.9

(51) Int. Cl.
 H01M 50/317 (2021.01)
 H01M 50/249 (2021.01)
(52) U.S. Cl.
 CPC ....... H01M 50/317 (2021.01); H01M 50/249 (2021.01); *H01M 2220/20* (2013.01)
(58) Field of Classification Search
 CPC ............. H01M 50/317; H01M 50/249; H01M 2220/20
 See application file for complete search history.

(56) References Cited

FOREIGN PATENT DOCUMENTS

DE    10 2011 109243    2/2013

OTHER PUBLICATIONS

Machine translation of DE 102011109243A! (Year: 2013).*
German Search Report dated Jan. 25, 2022.

* cited by examiner

*Primary Examiner* — Eugenia Wang
(74) *Attorney, Agent, or Firm* — Gerald E. Hespos; Michael J Porco

(57) ABSTRACT

A protective device for a housing, such as a battery housing, is provided for discharging an overpressure from the interior of the housing. The protective device has a closure element for sealing an opening in the housing in a first operating state. The closure element is arranged to be movable relative to the housing and is configured to be moved into a second operating state in a non-destructive manner. A bearing element is provided for guiding the closure element. The closure element may have at least in some regions, a membrane having a predetermined permeability, and in the second operating state the closure element uncovers the opening in the housing.

11 Claims, 5 Drawing Sheets

SECTION A-A

SECTION B-B

SECTION C-C

PROTECTIVE DEVICE FOR A HOUSING

BACKGROUND

Field of the Invention

The invention relates to a protective device for a housing, a housing comprising such a protective device, a battery system comprising such a housing having a protective device, and a vehicle having such a battery system.

Related Art

Certain components, such as batteries, can be accommodated in a housing and/or a container that may be sealed hermetically to protect the component from external environmental influences. A protective atmosphere made of a specific gas optionally can prevail in the interior of the housing and/or container.

However, temperature fluctuations, changes in the atmospheric pressure or a defect, such as a short-circuit in a battery, can cause a relative pressure to develop in a gas-filled housing that is sealed off from the surrounding area.

The relative pressure gives rise to a mechanical load on the housing, and the mechanical load can cause the housing to crack and/or implode.

Membranes have been used in housing walls to compensate for this relative pressure. The membranes are intended to enable air to pass into and/or out of the housing while protecting the interior of the housing from the ingress of water and dirt. However, such membranes generally have a limited flow rate. Heating and/or thermal decomposition of the housing contents can cause a relative pressure increase that cannot be controlled or compensated by an air flow through the membrane. In this situation, the membrane can no longer protect the container against inadmissible loading, thereby leading to a further rise in the relative pressure.

It is thus expedient to provide a protective device that is connected operatively to the housing interior, and that opens a flow cross-section from the housing interior to the surrounding area/atmosphere if the internal pressure is inadmissibly high. Thus, a drop in relative pressure can occur in the event of a very rapid build-up of relative pressure in the interior of the housing, Rupture discs also are known in the art as protective devices. The rupture disc bursts if a relative pressure is exceeded and uncovers a flow cross-section through which the relative pressure can be reduced. The disadvantage here is that the opening pressure of the individual rupture discs cannot be checked before they burst. For that reason, considerable investment is needed in the manufacture of rupture discs to ensure that they burst at a predetermined pressure. A further disadvantage of such rupture discs is that they are designed for one-time use only and are destroyed once they are tripped. Consequently, if the system is to remain in use, a new rupture disc and corresponding seals must be fitted at great expense. Another disadvantage is that rupture discs can be adapted to changes in trigger pressures only by means of time-consuming tests.

It is advantageous to develop a protective device that can be tested for an actual opening pressure at the end of production and only then be fitted to a housing. The test can be carried out by the manufacturer of the protective device as, for example, a 100% inspection at the end of the production process.

For reasons of installation space, weight and/or manufacturing costs, it is particularly advantageous to combine a membrane and a protective device in a single unit.

A problem addressed by the invention is that of providing a protective device that protects the interior of a housing and can quickly and reliably reduce a relative pressure in the interior of the housing. In particular, a problem addressed by the invention is that of providing a housing having such a protective device, a battery system having such a housing with a protective device, and a vehicle having such a battery system.

SUMMARY OF THE INVENTION

A first aspect of the invention concerns a protective device for a housing, in particular for a battery housing, for discharging an overpressure from the interior of the housing. The protective device of one embodiment comprises a closure element for substantially sealing an opening in the housing in a first operating state. The closure element is arranged so as to be movable relative to the housing and is configured to be moved into a second operating state in a non-destructive manner. The protective device of this embodiment further comprises a bearing element for guiding the closure element. At least in some regions of the closure element of this embodiment comprises a membrane having a predetermined permeability and, in the second operating state, the closure element substantially completely or at least mostly uncovers the opening in the housing.

The closure element of some embodiments is designed for tightly closing and/or covering the opening in the housing. The bearing element can be formed integrally with the housing and/or can be fit to the housing. Moreover, the bearing element can cover part of the opening in the housing.

The closure element and/or the protective device of some embodiments is configured to remain in the first operating state when and/or for as long as a relative pressure in the interior of the housing as compared with the surrounding area does not exceed a first limit value.

The closure element and/or the protective device of some embodiments is configured to move to the second operating state when and/or after a relative pressure in the interior of the housing has exceeded a first limit value.

The closure element of some embodiments is configured and arranged to be moved by an overpressure in the interior of the housing. In particular, the protective device is configured so that an overpressure in the interior of the housing causes a force to act and/or be exerted on the closure element, directed away from the interior of the housing.

The protective device of some embodiments is configured to be moved easily into the first operating state after being tripped, without tools and/or replacement of components. Thus, it is possible for the protective device to be tripped repeatedly.

The membrane that is arranged on the closure element of some embodiments may have a predetermined gas permeability that is suitable for compensating for a pressure difference that is commonly found in the automotive sector, in particular a pressure compensation of approximately +−0.2 bar, based on temperature and/or height differences.

Alternatively, a membrane can be arranged only on the closure element or additionally also on the housing or only on the housing. In particular, a membrane can substantially close and/or cover an additional opening in the housing.

The membrane of some embodiments is substantially impermeable to dust, in accordance with protection rating IP6X for example, to prevent an ingress of foreign bodies into the interior of the housing. At least one side of the membrane may be substantially water-impermeable, in accordance with protection rating IPX6K, IP6KX, IPX7, IPX9K or IPX8, for example. A membrane with protection rating IP67 is particularly advantageous. The membrane may be arranged on the closure element in a way that substantially prevents an ingress of water into the interior of the housing. For example, the membrane may comprise PTFE (polytetrafluoroethylene) with micropores or has a structure with corresponding properties. Alternatively and/or additionally, the membrane may have an air permeability between approximately 1 and approximately 25 l/(dm2*min), more preferably between approximately 2.5 and approximately 10/(dm2*min) (particularly with a pressure drop of approximately 200 Pa—for example in accordance with DIN EN ISO 9237). The membrane of some embodiments has a thickness between approximately 0.1 and approximately 0.5 mm, more preferably between approximately 0.13 and approximately 0.18 mm, in particular a thickness of approximately 0.14 mm.

The protective device of some embodiments also comprises at least one tensioning element. The at least one tensioning element may be coupled to the closure element in the first operating state so that the tensioning element substantially positions, secures, locks and/or holds the closure element in position on the housing.

The tensioning element can be dimensioned, designed and/or positioned so that a tripping of the protective device is triggered at a desired trigger pressure and/or a predetermined relative pressure in the interior of the housing.

At least part of the tensioning element may be coupled to the housing and/or to the bearing element so that the tensioning element exerts a force on the closure element. This ensures that the tensioning element substantially prevents, or at least significantly reduces, a movement of the closure element relative to the housing and/or to the opening in the first operating state, particularly if a pressure in the interior of the housing does not exceed a first limit value. Therefore, the at least one tensioning element of this embodiment is configured to exert a force on the closure element and to lock and/or hold the closure element in the first operating state and/or substantially to prevent, or at least to hinder, movement of the closure element out of the first operating state.

The tensioning element of some embodiments is designed and coupled to the closure element so that the closure element is moved relative to the bearing element and/or to the housing and/or to the opening, due to a relative pressure in the interior of the housing for example, and at least part of the tensioning element is moved and/or at least temporarily deformed as a consequence.

In the second operating state, the at least one tensioning element of some embodiments is decoupled from the closure element, such that the at least one tensioning element exerts no force on the closure element in the second operating state. In the second operating state of this embodiment, there is no coupling between the tensioning element and the closure element, or at least no coupling that hinders and/or prevents a movement of the closure element away from the housing and/or from the opening.

The protective device of some embodiments is designed so that, at a relative pressure in the interior of the housing of approximately 0.3 to approximately 0.8 bar, the closure element is moved so that the tensioning element decouples from the closure element and uncovers the opening in the housing. The protective device may be designed so that a movement of the closure element from the first operating state into the second operating state takes place at a relative pressure in the interior of the housing of between approximately 0.3 and approximately 0.5 bar.

The tensioning element can comprise, for example, one or more leg springs that have no, one or plural coils. In particular, the tensioning element can comprise strips and/or wires of steel and/or spring steel and/or copper alloys, such as e.g. beryllium copper, and/or nickel alloy and/or titanium alloy and/or plastic and/or rubber. Alternatively and/or in addition, the tensioning element can have one or more spring-loaded, elastic and/or deformable elements that can interact suitably with the closure element.

The closure element and/or the bearing element preferably closes the opening in the housing. The bearing element may be designed and arranged around the opening and/or on the opening in the housing so that the bearing element radially surrounds at least part of the closure element in the first operating state.

In particular, the bearing element can have a substantially cylindrical section in which the closure element is arranged so as to be movable in the axial direction of the cylindrical section in the first operating state.

The closure element of some embodiments fits substantially exactly in a through-opening of the bearing element and closes this through-opening in a substantially fluid-tight manner, such that a pressure compensation can take place only through the optional membrane of the closure element.

The closure element and/or the bearing element of some embodiments has one or more outlet openings, through which fluid, in particular gas, can escape from the interior of the housing when the closure element is in a third operating state, for example when the closure element has been moved out of the first operating state into a position in which the opening has not been substantially completely uncovered. In particular, the third operating state corresponds to a position of the closure element between the first operating state and the second operating state. A limited uncovering of the opening can occur through the one or more outlet openings so that a relative pressure in the interior of the housing is not lowered abruptly but rather first is reduced partly and/or lowered through the outlet opening(s).

The sum of the surface areas of the one or more outlet openings is preferably less than, preferably 30% less than, more preferably 50% less than, more preferably 80% less than the completely uncovered opening in the housing.

Outlet openings can be rectangular, round, oval and/or conical in shape and/or can be provided substantially symmetrically on the closure element and/or on the bearing element.

The protective device of some embodiments comprises a retaining element to limit a movement of the closure element beyond the position of the second operating state and/or to prevent a decoupling between the closure element and the housing. A retaining element can comprise, for example, a retaining cable and/or retaining strap and/or retaining belt, which connects the closure element to the housing and/or to the bearing element. Alternatively and/or in addition, a clamp and/or a stopper element can be provided to stop a movement of the closure element beyond a defined position, such that the closure element cannot be separated and/or uncoupled from the housing and/or from the bearing element. The retaining element may be integral or unitary with the closure element and/or the bearing element. Alternatively and/or in addition, the retaining element can be formed from one or more pieces.

The protective device may comprise a seal arranged between the closure element and the bearing element and/or the housing, such as on an upper free edge region of the bearing element, so as not to hinder and/or impede a movement of the closure element from the first operating state into the second operating state.

Further aspects of the invention concern a housing, in particular a battery housing, comprising the protective device described above, and a battery system comprising such a housing with a storage battery located therein to store electrical energy. A further aspect of the invention concerns a vehicle, in particular a road vehicle, comprising such a battery system.

Individual embodiments for solving the problem are described below by way of example with reference to the drawings. Some of the embodiments described have features that are not absolutely necessary to carry out the claimed subject matter but that provide desired properties in certain applications. Therefore, embodiments that do not have all features of the embodiments described below should also be considered to be covered by the claimed invention. Moreover, to avoid unnecessary repetitions, certain features are mentioned only in relation to some of the embodiments described below. Therefore, the individual embodiments should be considered not only in isolation but also in conjunction with one another. A person skilled in the art will discern from this overall view that individual embodiments can be modified by the inclusion of one or more features of other embodiments. It is noted that a systematic combination of the individual embodiments with one or more features that are described in relation to other embodiments can be desirable and expedient and should therefore be taken into consideration and also be regarded as being covered by the description

DETAILED DESCRIPTION

Figure 1:
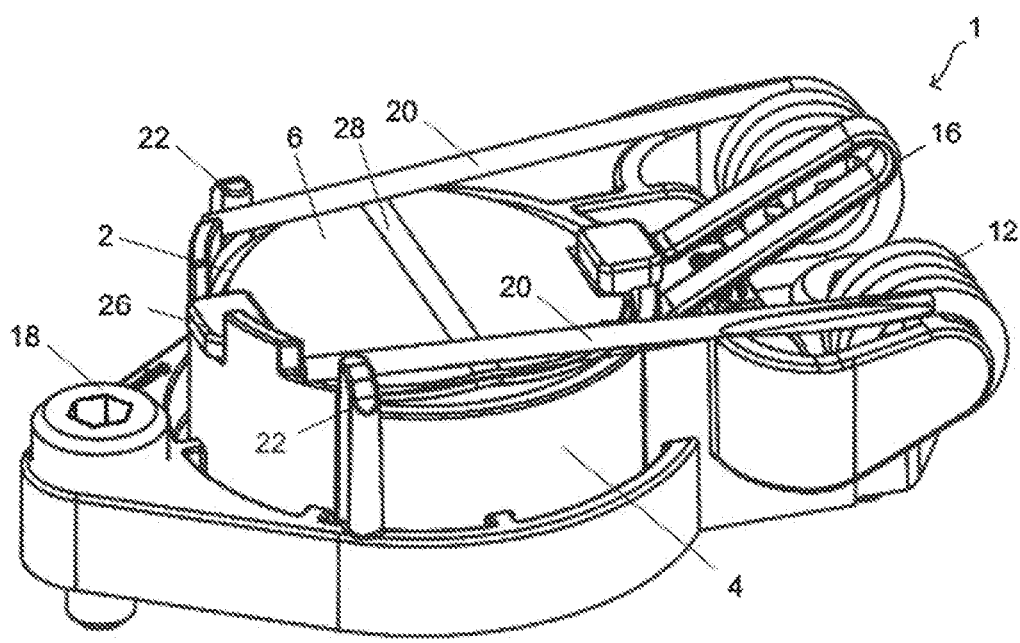
FIG. 1 is a perspective view of a protective device of one embodiment with a closure element in a first operating state.

FIG. 1 shows an exemplary design of a protective device 1 with a closure element in a first operating state. The depicted protective device 1 comprises a bearing element 4 that is configured to be connected and/or coupled to a shell of the housing 10. In the depicted embodiment of the protective device 1, the bearing element 4 has a substantially cylindrical section in which the closure element 2 is arranged so as to be axially movable.

In FIG. 1, the protective device 1 is shown in the first operating state, i.e. the closure element is positioned for substantially sealing and/or closing and/or covering the opening 8 of the housing 10. In the first operating state, the protective device 1 is configured to close and/or to seal the opening 8 (see inter alia FIG. 4) of the housing 10 in such a way that fluid, particularly gas, can escape from the interior of the housing 10 through the opening 8 and/or enter the interior of the housing 10 substantially only through a membrane 6 that is optionally arranged on the closure element 2.

The closure element 2 depicted in FIG. 1 is piston-shaped. In particular, the closure element 2 is designed to be fitted substantially exactly in the bearing element 4 so as to be movable therein.

Alternatively and/or in addition, the bearing element 4 can be formed integrally with the housing 10. For example, the shell of the housing 10 can have structures that are suitable for supporting and/or guiding the closure element 2.

The closure element 2 of the protective device 1 preferably comprises the membrane 6. The membrane 6 preferably is designed so that fluid, particularly gas, can flow and/or diffuse through the membrane 6 into the interior of the housing 10, but water and/or dirt and/or dust are substantially kept out or blocked by the membrane and are thus prevented from penetrating into the interior of the housing 10. The membrane 6 is particularly preferably designed in accordance with the requirements of protection rating IP6X and/or IPX6-IPX8. The membrane can comprise a PTFE film with micropores, for example.

The membrane 6 preferably is arranged on the closure element 2 in such a way that if the closure element 2 and/or the protective device 1 is in the first operating state, a pressure compensation can take place between the interior of the housing 10 and the atmosphere surrounding the housing 10. In other words, the closure element 2 is arranged so that fluid can flow into the housing 10 and out of the housing 10 through the opening 8 and the membrane 6. In the depicted embodiment, the closure element comprises a rib 28 that supports the membrane 6. Advantageously, the surface area of the membrane 6 is as large as possible to obtain the greatest possible pressure compensation capacity.

The illustrated protective device 1 comprises at least one tensioning element 12 that is designed to fix and/or to hold in position and/or to lock the closure element 2 in the first operating state. In this embodiment, the tensioning element 12 has a leg spring comprising at least one, preferably a pair, of spring legs 20. The at least one leg spring preferably contains a nickel alloy and/or a titanium alloy. The at least one leg spring preferably is supported with respect to the housing 10 and/or the bearing element 4 such that the spring leg 20 is deformed elastically and pretensioned in the first operating state and exerts a force on the closure element 2 in the direction of the housing 10 for at least temporarily fixing and/or holding the closure element 2 in the first operating position. As shown in FIG. 1, the bearing element 4 preferably has a support element 22 for each spring leg 20, on which the spring legs 20 are supported in the first operating position.

The tensioning element 12 and the support elements 22 preferably are arranged and/or designed and/or dimensioned such that a coupling of the tensioning element 12 to the closure element 2 exists and is maintained in a first operating position, provided that a force that acts on the closure element 2 from the interior of the housing 10, owing to an overpressure, is lower than the force exerted by the tensioning element 12 on the closure element 2 in the opposite direction.

One or more support elements 22 are positioned and/or designed in such a way that, by abutment of at least part of the tensioning element 12, in particular of the spring legs 20, a holding in position of the closure element 2 by the tensioning element 12 is supported. Advantageously, the at least one support element 22 prevents a spring leg 20, preferably a spring leg that is pretensioned in the direction of the closure element 2 and/or radially outwards, from assuming a substantially non-pretensioned position and/or from being decoupled from the closure element 2 in the first operating state. In particular—in the depicted preferred embodiment—the radially inwardly oriented sides, i.e. the facing and/or aligned sides, of the support elements 22 can be conical and/or gradated and/or curved in shape. In particular, a resistance from the support elements 22 if the spring legs 20 are moved away from the housing 10 can be built up and/or increased in this way by increasing the pretension of the spring legs 20 radially inwards and substantially perpendicular to the longitudinal axis of the spring legs 20. This is particularly advantageous because a progressive movement of the closure element 2 of this nature requires a greater relative pressure in the interior of the housing 10.

Alternatively, at least part of the radially inwardly oriented side of the support element 22 can be designed to slope and/or recede radially outwards. This is advantageous because a movement of the spring legs 20 and hence also of the closure element 2 is supported and/or accelerated in this way. A decoupling of the tensioning element 12 from the support elements 22 can be promoted and/or supported in this way, in order to accelerate an uncovering of the opening 8.

In this and similar ways, the decoupling of the tensioning element 12 from the support elements 22 and from the closure element 2 and the resulting uncovering of the opening 8 can be adjusted and/or defined by the closure element 2.

As an alternative to the depicted tensioning element 12, the protective device 1 can also comprise one or more differently designed tensioning elements 12, for example in the form of one or more springs and/or one or more spring-loaded and/or elastically deformable elements. In particular, one or more spring legs 20 can be angled and/or bent radially outwards and/or away from one another, at least in some regions. The force exerted by the one or more spring legs 20 on the closure element 2 can advantageously be increased in this way. Alternatively and/or in addition, an advantageous decoupling of the one or more spring legs 20 from the closure element 2 when the closure element 2 is moved can be achieved in this way, for example because, when the closure element 2 is in a certain position between the first operating state and the second operating state, the one or more spring legs 20 are substantially abruptly decoupled from the closure element 2 in this way.

Figure 2:
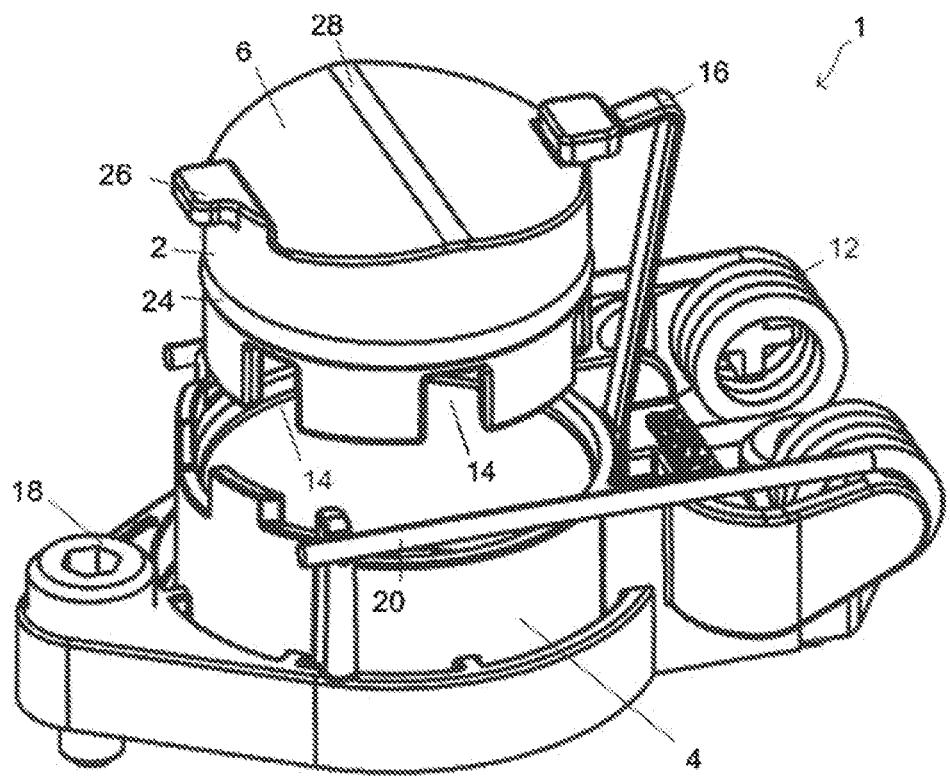
FIG. 2 is a perspective view of the protective device of FIG. 1 with a displaced closure element in a second operating state.

FIG. 2 shows the protective device 1 of FIG. 1 in a second operating state. In the depicted second operating state, the closure element 2 is moved with respect to the housing 10 and/or the bearing element 4 in such a way that the closure element 2 substantially completely uncovers the opening 8 of the housing 10. In particular, the closure element 2 is then positioned with respect to the bearing element 4 and/or the housing 10 in such a way that the closure element 2 substantially no longer covers and/or closes and/or seals the opening 8 of the housing 10. In the depicted preferred embodiment of the protective device 1 in the second operating state, the closure element 2 is moved substantially in an axial direction of the cylinder formed by the bearing element 4 and away from the housing 10.

The second operating state of the protective device 1 and/or of the closure element 2 is defined such that an opening between the housing 10 and/or the bearing element 4 with respect to the closure element 2 allows a fluid flow of preferably greater than approximately 1 Vs, more preferably greater than approximately 30 Vs, more preferably greater than approximately 90 Vs, and/or preferably greater than approximately 50 grams of gas per second, more preferably greater than approximately 120 grams of gas per second. In the second operating state, the protective device 1 preferably is configured to quickly reduce an overpressure present in the housing 10 as compared with the surrounding area and/or atmosphere, preferably in less than one second, more preferably substantially immediately, through the opening 8.

As shown in FIG. 2, the spring legs 20 of the retaining element 16 are not coupled to the closure element 2, i.e. a force is no longer exerted by the tensioning element 12 on the closure element 2. The transition between the first operating state and the second operating state is shown in detail in FIGS. 3-9 and explained below.

As shown in FIG. 2, the protective device 1 more preferably comprises a retaining element 16 that limits a movement of the closure element 2 beyond the position of the second operating state and/or prevents a complete decoupling of the closure element from the bearing element and/or from the housing 10. The retaining element 16 preferably comprises a cable, a strap and/or a belt.

Figure 3:
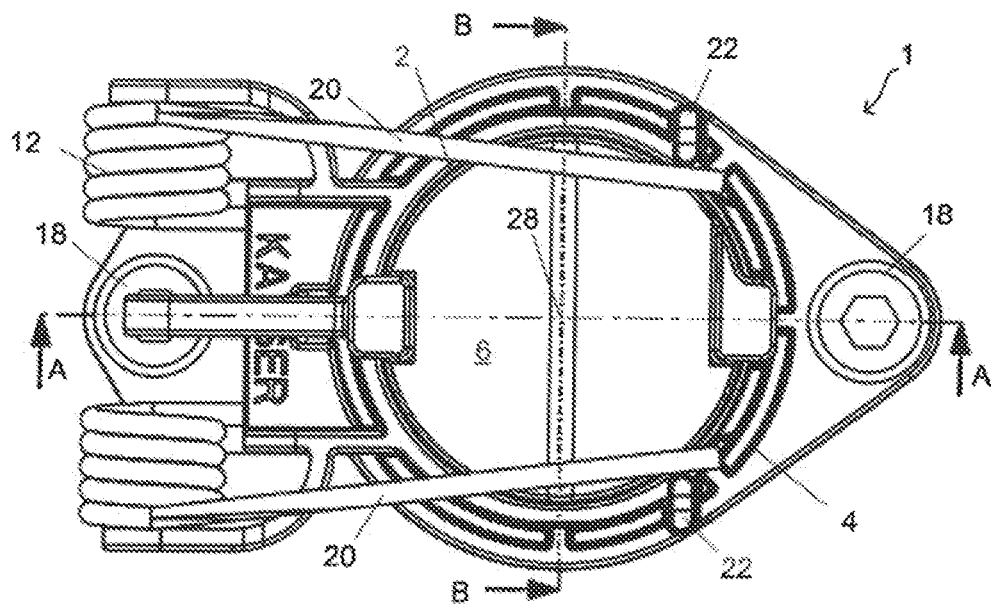
FIG. 3 is a top elevational view of the protective device of FIG. 1.

FIG. 3 is a top view of the exemplary protective device of FIG. 1 in the first operating position. In the first operating position, at least part of the tensioning element 12 preferably is coupled to the closure element 2 and exerts a force on the closure element 2 to hold the closure element 2 in the first operating position. As shown, the tensioning element 12 comprises a leg spring with two spring legs 20. In the depicted embodiment of the protective device 1, the leg spring is arranged on the housing 10 and/or on the bearing element 4 in such a way that, in the first operating state, the spring legs 20 are pretensioned in a direction substantially perpendicular to the plane of the opening 8 of the housing 10 and at the same time are pretensioned in respect of one another in a radial direction of the bearing element 4 and/or of the closure element 2, i.e. in a direction substantially parallel to the plane of the opening 8. One or more support elements 22 preferably are provided on the housing 10 and/or on the bearing element 4, on which the spring legs 20 are supported. The closure element 2 is substantially fixed and/or locked in the position of the first operating state in this way.

Figure 4:
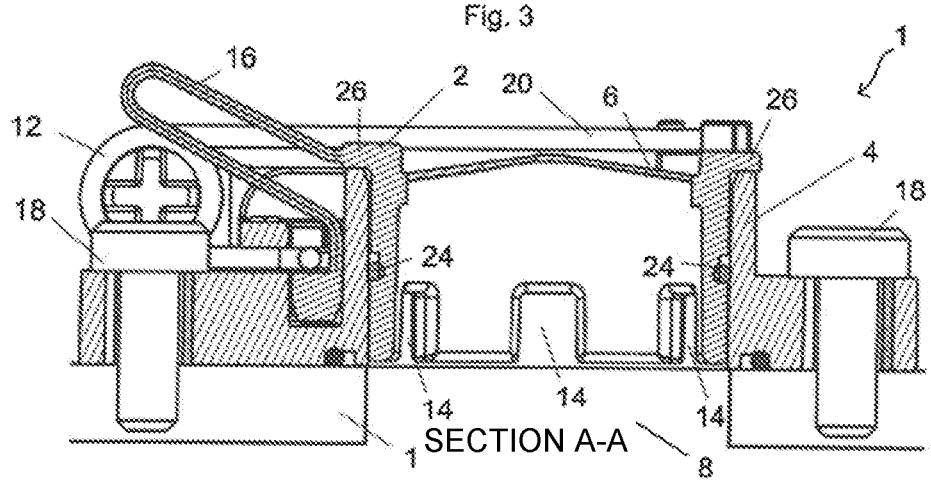
FIG. 4 is a cross-sectional view taken along line A-A of FIG. 3.

FIG. 4 is a cross-section of the protective device 1 along the line A-A of FIG. 3. At least part of the closure element 2 preferably is arranged and/or positioned substantially exactly inside at least part of the bearing element 4. A substantially fluid-tight and/or fluid-impermeable seat of the closure element 2 in the bearing element 4 is preferred. To achieve such a tightness, one or more seals 24 can be provided between the bearing element 4 and the closure element 2 and/or between the closure element 2 and the housing 10 and/or between the bearing element 4 and the housing 10.

As shown in FIG. 4, a movement of the closure element 2 towards the housing 10 is prevented by one or more projections 26 of the closure element 2 that are supported on the bearing element 4.

A seal 24 acts substantially axially with respect to the closure element 2 and/or orthogonally with respect to the opening 8 and/or to the housing 10. For example, the seal 24 is arranged between a circumferential projection 26 of the closure element 2 and the bearing element 4. In particular, the seal 24 can be arranged on the upper free edge region of the bearing element 4, and preferably surrounding the bearing element 4. Such a seal 24 allows for a better seal in the first operating state, since the seal 24 is deformed and/or pretensioned by the force exerted by the tensioning element 12 on the closure element 2. Moreover, the seal 24 does not exert a force on the closure element 2 that hinders and/or prevents the movement of the closure element 2 from the first into the second operating state.

The spring legs 20 of the tensioning element 12 are coupled to the closure element 2 in the first operating position and hold the closure element 2 in position so that an escape of fluids, in particular of gases, from the interior of the housing 10 through the opening 8 is prevented or at least significantly reduced.

As shown in FIG. 4, the retaining element 16 is preferably in a substantially relaxed and/or compressed and/or collapsed state in the first operating state. As an alternative to the depicted retaining element 16 in the form of a retaining cable and/or belt, the retaining element 16 can be a clamp (see FIG. 10) and/or stopper.

The bearing element 4 is coupled and/or attached to the housing 10 by one or more fastening elements 18. In the depicted embodiment, two screws are provided, each of which engages with a thread in the housing 10.

Figure 5:
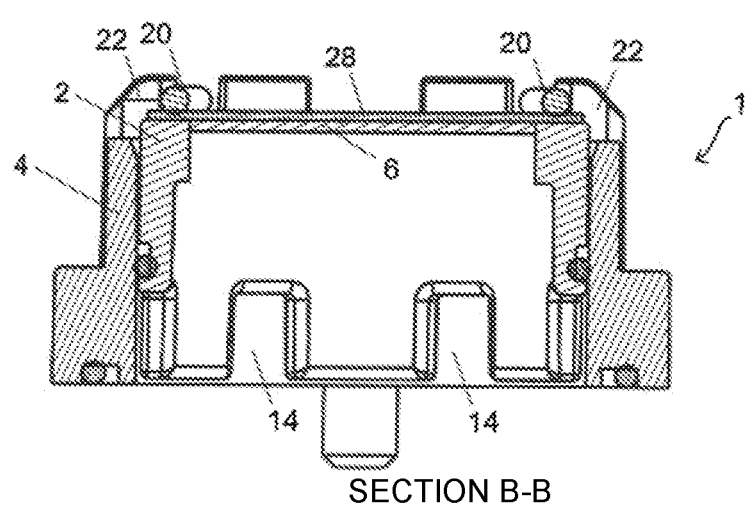
FIG. 5 is a cross-sectional view taken along line B-B in FIG. 3.

FIG. 5 is a cross-section of the protective device of FIG. 1 along the line B-B in FIG. 3. As shown, the spring legs 20 of the tensioning element 12 rest on the upper side of the closure element 2, circumferentially to the housing 10, and exert a force on the closure element 2 directed towards the housing 10.

The protective device 1 is shown in the first operating state in FIGS. 1, 3, 4 and 5. In this first operating state, the opening 8 of the housing 10 is sealed and/or closed in a fluid-tight manner, such that a pressure compensation between the interior of the housing 10 and the atmosphere can take place only through the optional membrane 6, in particular via a flow of air and/or gas through the membrane 6.

As shown in FIG. 5, the radially inwardly directed sides of the support elements 22 are substantially linear. Alternatively, these sides can have one or more structures, in particular grooves or depressions that influence, in particular hinder, a movement of the spring legs 20 in the desired way. Alternatively and/or in addition, the sides can slope radially inwards, such that, when moved, the spring legs 20 of the tensioning element 12 are pretensioned farther away from the opening before the support elements 22 release the spring legs 20 radially outwardly.

Figure 6:
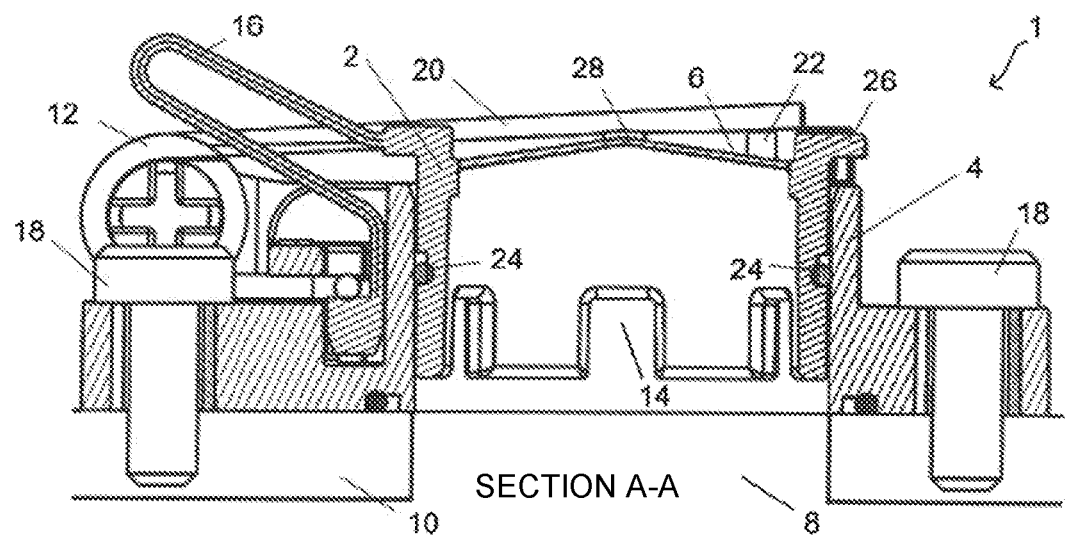
FIG. 6 is a cross-sectional view similar to FIG. 4 but showing the closure element displaced by a first amount.

FIG. 6 shows the protective device 1 in a state in which the closure element 2 is moved in relation to the first operating state, as a result of an overpressure in the interior of the housing 10, for example. As shown, the closure element 2 is positioned farther away from the housing 10 in comparison to the first operating state. In the depicted state of the closure element 2, the tensioning element 12 is coupled to the closure element 2 such that the tensioning element 12 exerts a force on the closure element 2 in the direction of the housing 10. In this state, the relative pressure in the interior of the housing 10, and hence the force acting on the closure element 2 from the interior of the housing 10, is below a first limit value.

In this state, the opening 8 of the housing 10, just as in the first operating state of the protective device 1 and/or of the closure element 2, is sealed and/or closed.

Figure 7:
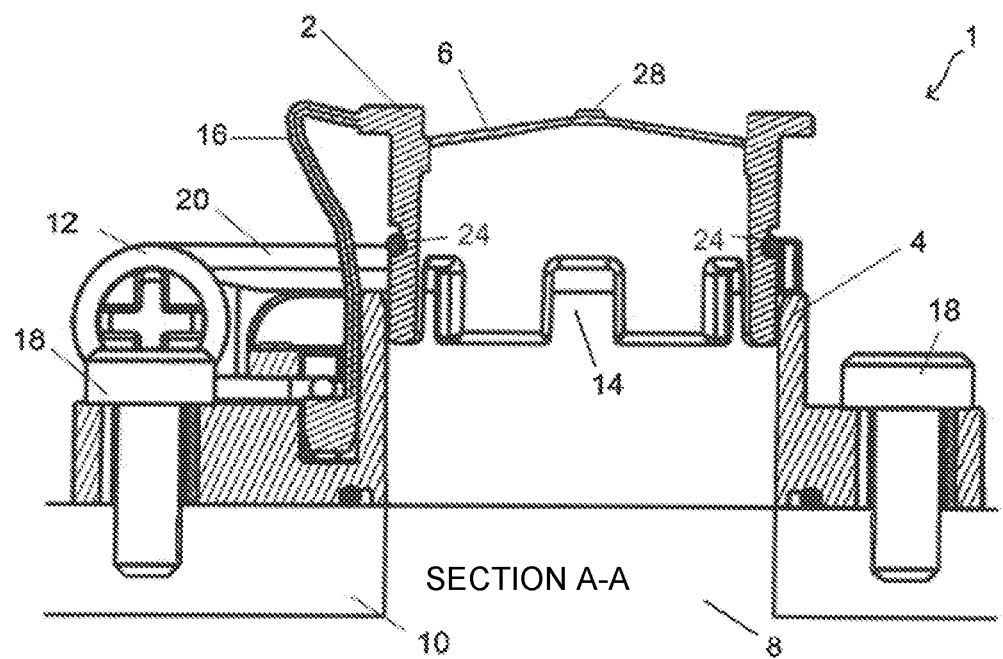
FIG. 7 is a cross-sectional view similar to FIG. 4 but showing the closure element displaced by a second amount that exceeds the amount shown in FIG. 6.

FIG. 7 shows the protective device 1 with the closure element 2 in an optional third operating state. The third operating state is characterized in that the closure element 2 has been moved to a position in which the protective device 1 no longer completely seals and/or substantially closes the opening 8 of the housing 10. In the third operating state, the closure element 2 is in a position between the first operating state and the second operating state.

In the third operating state, fluid, particularly gas, can flow via one or more outlet openings 14 of the closure element 2 through the opening 8 from the interior of the housing 10 into the atmosphere and/or surrounding area. The one or more outlet openings 14 preferably are arranged laterally in and/or on the closure element 2, to allow for a substantially radial release of the fluid.

To reach this state, the relative pressure in the interior of the housing 10, and hence the force acting on the closure element 2 from the interior of the housing 10, must be above the first limit value. The first limit value and the design of the protective device 1 preferably are matched such that a discharge of fluid when the closure element 2 is moved occurs only when the first limit value is exceeded. In particular, the force exerted by the tensioning element 12 on the closure element 2 is designed such that the closure element 2 is moved to the position of the third operating state when there is a specific overpressure in the interior of the housing 10.

This third operating state allows for a gradual and/or stepwise pressure reduction in the interior of the housing 10. Instead of an abrupt and substantially complete uncovering of the opening 8 of the housing 10 and an associated abrupt pressure drop in the interior of the housing 10, an advantageous gradual and non-damaging discharge and/or reduction of an overpressure from the interior of the housing 10 through the opening 8 can be achieved via one or more outlet openings 14. In particular, the total surface area of the uncovered regions of the outlet openings 14 is less than the surface area of the opening 8.

The one or more outlet openings 14 in the closure element 2 can be designed, shaped and/or positioned to achieve an advantageous progression of a drop in the overpressure in the interior of the housing 10. In particular, an outlet opening 14 can be round and/or oval and/or rectangular and/or trapezoidal. Alternatively and/or in addition, one or more outlet openings 14 can be arranged on the bearing element 4 to allow for a gradual and/or stepwise outflow of fluid from the interior of the housing 10.

As shown in FIG. 7, the tensioning element 12 is decoupled from the closure element 2 in the third operating state, such that the tensioning element 12 no longer exerts a force on the closure element 2. This is particularly advantageous for moving the closure element 2 farther without any application of force by the tensioning element 12.

As an alternative, the tensioning element 12 can remain coupled to the closure element 2 in the depicted third operating state. In particular, this has the advantage that in the event of a pressure drop in the interior of the housing via the uncovered regions of the outlet openings 14, the closure element 2 can be returned to the first operating state by the tensioning element 12. In this way, the protective device 12 can return to a substantially sealing and/or closing state.

The support elements 22 preferably are designed so that the spring legs 20 moved by the closure element 2 are supported and/or pretensioned radially inward by the support elements 22 in the third operating state. Only when the closure element 2 and the spring legs 20 are moved beyond the position of the third operating state are the spring legs 20 decoupled from and/or released by the support elements 22, causing the spring legs 20 to move apart from one another radially outwardly and the coupling to the closure element 2 to be released. The closure element 2 then can be moved farther from the opening 8 of the housing 10 substantially unhindered.

Figure 8:
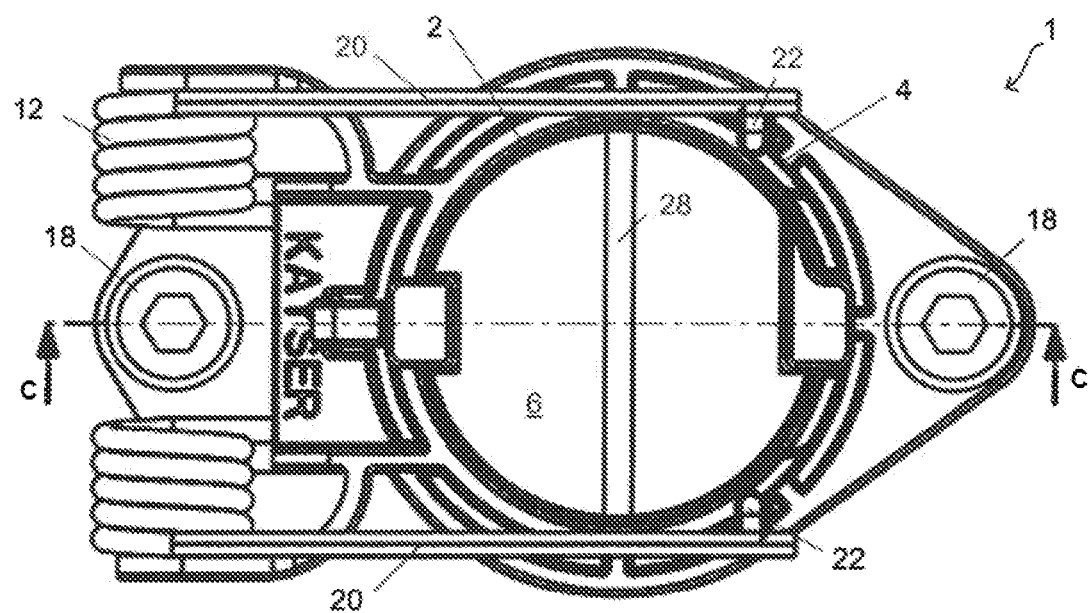
FIG. 8 is a top elevational view of the protective device of FIG. 2 with the closure element displaced to the second operating state.

FIG. 8 is a top view of the protective device 1 in the second operating state, as shown in FIG. 2. In the second operating state the closure element 2 was moved in such a way that the opening 8 in the housing 10 is substantially uncovered and/or open so that fluid, particularly gas, can flow through the opening 8 substantially unhindered.

In the second operating state, the tensioning element 12 is substantially uncoupled from the closure element 2. In particular, the spring legs 20 of the tensioning element 12 are moved by the closure element 2, by reason of the relative pressure in the interior of the housing 10, in such a way that the spring legs 20 were no longer pretensioned radially inwards by the support elements 22, such that the spring legs 20 are moved radially outwards and decoupled from the closure element.

In the second operating state, the tensioning element 12 is preferably in a substantially relaxed and/or non-pretensioned state. In particular, the spring legs 20 of the tensioning element 12, in contrast to the first operating state, are not pretensioned inwards in the radial direction of the bearing element 4 and/or the closure element 2. The spring legs 20 are preferably each positioned on the radially outward sides of the support elements 22. The spring legs 20 optionally are locked in the second operating position so as to hold the spring legs 20 in a specific position.

The protective device 1 preferably is configured to be moved substantially in a non-destructive manner from the second operating state into the first operating state, in particular manually. To this end, the closure element 2 is positioned in the bearing element 4 and/or in the opening 8 of the housing 10, and the tensioning element 12, in particular the spring legs 20, are moved over the support elements 22 and into contact with the closure element 2. In this way, the protective device 1, after being tripped, when testing and/or inspecting the protective device 1 for example, can be transferred to the functional, first operating state and then put into service in a battery system, for example.

Figure 9:
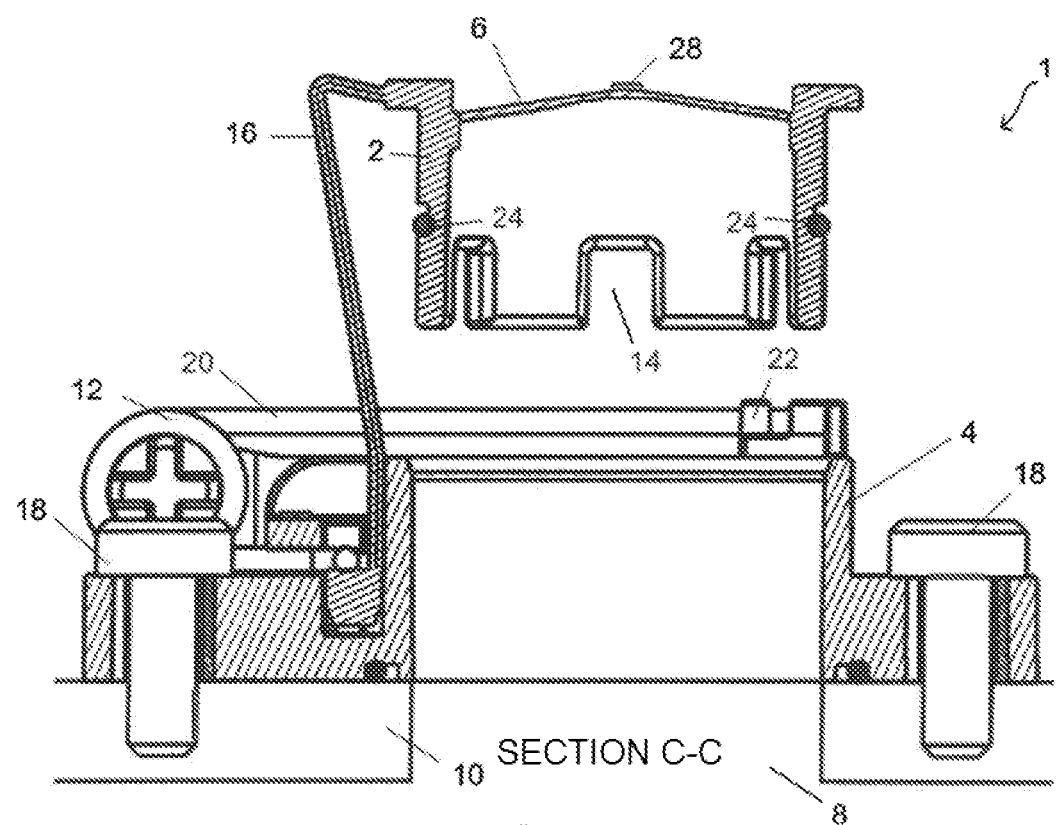
FIG. 9 is a cross-sectional view taken along line C-C in FIG. 8.

FIG. 9 shows a cross-section along the line C-C of FIG. 8 of the protective device 1 in the second operating state with a closure element 2 displaced in the axial direction. In this embodiment, the closure element 2 is in a position where it is not guided and/or supported by the bearing element 4. The retaining element 16 prevents a complete decoupling and/or release of the closure element 2 from the protective device 1, in particular from the bearing element 4, and/or from the housing 10.

In the second operating state, the closure element 2—as an alternative to the depicted exemplary embodiment—can be coupled at least in some regions to the bearing element 4 and/or can be guided thereby. This is particularly advantageous if a further movement of the closure element 2 is to be controlled, for example to prevent a collision with another component. Alternatively and/or in addition, the retaining element 16 can be configured to guide the closure element 2.

Figure 10:
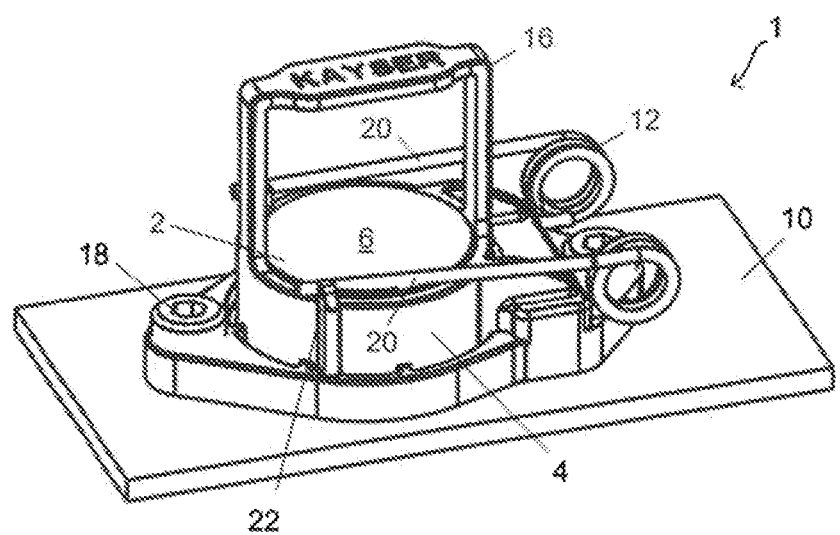
FIG. 10 is a perspective view of a protective device with a further exemplary retaining element.

FIG. 10 shows a protective device 1 arranged on a housing 10 and having a retaining element 16 in the form of a clamp. The clamp is arranged on the bearing element 4 and/or the housing 10 so that a movement of the closure element 2 is prevented after reaching the position of the second operating state. The clamp preferably is configured to guide and/or to direct and/or to stabilize the closure element 2 while it is moved.

LIST OF REFERENCE SIGNS

1 Protective device
2 Closure element
4 Bearing element
6 Membrane
8 Opening
10 Housing
12 Tensioning element
14 Outlet opening
16 Retaining element
18 Fastening element
20 Spring leg
22 Support element
24 Seal
26 Projection
28 Rib

The invention claimed is:

1. A protective device (1) for discharging an overpressure from an interior of a housing (10), wherein the protective device comprises:
a closure element (2) for sealing an opening (8) in the housing (10) in a first operating state, the closure element (2) being arranged to be movable relative to the housing (10) and being configured to be moved into a second operating state in a non-destructive manner, and the closure element (2) that is in second operating state uncovers the opening in the housing (10);
a bearing element (4) for guiding the closure element (2); and
at least one tensioning element (12) coupled to the closure element (2) in the first operating state in order to position the closure element (2) on the housing (10), the at least one tensioning element (12) being decoupled from the closure element (2) in the second operating state, such that the at least one tensioning element (12) exerts no force on the closure element (2) in the second operating state.

2. The protective device (1) of claim 1, wherein the closure element (2) comprises, at least in some regions, a membrane (6) having a predetermined permeability.

3. The protective device (1) of claim 1, wherein the tensioning element (12) comprises one or more leg springs (20).

4. The protective device (1) of claim 1, wherein the bearing element (4) is arranged around the opening (8) of the housing (10) and radially surrounds at least part of the closure element (2) in the first operating state.

5. The protective device (1) of claim 1, wherein the bearing element (4) has a substantially cylindrical section in which the closure element (2) is arranged so as to be movable in an axial direction in the first operating state.

6. The protective device (1) of claim 1, wherein the closure element (2) comprises one or more outlet openings (14) through which fluid can escape from the interior of the housing (10) when the closure element (2) is in a third operating state.

7. The protective device (1) of claim 1, further comprising:
 a retaining element (16) to limit a movement of the closure element (2) beyond the position of the second operating state and/or to prevent a decoupling between the closure element (2) and the housing (10).

8. The protective device (1) of claim 1, further comprising:
 a seal (24) arranged between the closure element (2) and the bearing element (4) and/or the housing (10) so as not to hinder a movement of the closure element (2) from the first operating state into the second operating state.

9. A housing (10) comprising the protective device (1) of claim 1.

10. A battery system comprising the housing (10) of claim 9 and at least one storage battery to store electrical energy.

11. A vehicle comprising the battery system of claim 10.

\* \* \* \* \*